US008106908B2

(12) United States Patent
Okuno et al.

(10) Patent No.: US 8,106,908 B2

(45) Date of Patent: Jan. 31, 2012

(54) IMAGE GENERATING APPARATUS AND METHOD, AND IMAGE DISPLAY APPARATUS AND METHOD

(75) Inventors: Yoshiaki Okuno, Tokyo (JP); Jun Someya, Tokyo (JP); Satoshi Yamanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1075 days.

(21) Appl. No.: 11/921,890

(22) PCT Filed: Apr. 19, 2006

(86) PCT No.: PCT/JP2006/308195

§ 371 (c)(1), (2), (4) Date: Dec. 10, 2007

(87) PCT Pub. No.: WO2007/004346

PCT Pub. Date: Jan. 11, 2007

(65) Prior Publication Data

US 2009/0128566 A1 May 21, 2009

(30) Foreign Application Priority Data

Jul. 4, 2005 (JP) ................................ 2005-194893

(51) Int. Cl.
*G06T 11/20* (2006.01)

(52) U.S. Cl. ........................................................ 345/467

(58) Field of Classification Search .................. 345/467
See application file for complete search history.

(56) References Cited

U.S. PATENT DOCUMENTS

| | | | | |
|---|---|---|---|---|
| 4,115,765 | A * | 9/1978 | Hartke | 345/553 |
| 4,240,075 | A * | 12/1980 | Bringol | 345/25 |
| 4,283,724 | A * | 8/1981 | Edwards | 345/26 |
| 4,633,433 | A * | 12/1986 | Miller | 340/995.14 |
| 5,377,319 | A * | 12/1994 | Kitahara et al. | 715/707 |
| 6,593,948 | B1 * | 7/2003 | Suetani et al. | 715/841 |
| 7,301,672 | B2 * | 11/2007 | Abe et al. | 358/1.9 |

FOREIGN PATENT DOCUMENTS

| | | | |
|---|---|---|---|
| JP | 58-82375 | A | 5/1983 |
| JP | 59-13282 | A | 1/1984 |
| JP | 60-61269 | A | 4/1985 |
| JP | 1-301355 | A | 12/1989 |
| JP | 4-277821 | A | 10/1992 |
| JP | 2003-208148 | A | 7/2003 |

* cited by examiner

*Primary Examiner* — Javid Amini

(74) *Attorney, Agent, or Firm* — Birch Stewart Kolasch & Birch, LLP

(57) ABSTRACT

To solve the problem that when a space with a set width is inserted after each character to regularize the spaces between characters the overall character spacing is widened, making text less easy to read, there are provided a character control code storage unit (5) for storing, for each character display position, a character control code (CTD) including a character code (CC) and character width data (CW), and a positional control unit (4) for reading the character control code (CTD) for the present character display position from the character control code storage unit (5), and controlling the occurrence interval of the present character display position according to the character width data (CW) in the character control code (5) that was read and the previous character display position.

8 Claims, 13 Drawing Sheets

| CHARACTER POSITION P (XP, YP) | CHARACTER CONTROL CODE CTD | | | CHARACTER |
|---|---|---|---|---|
| | CHARACTER CODE CC | CHARACTER WIDTH CW | CHARACTER ATTRIBUTE INFORMATION CA | |
| (1 ,1) | 1 | 8 | CA (1, 1) | 'R' |
| (2, 1) | 2 | 8 | CA (2, 1) | 'A' |
| (3, 1) | 3 | 8 | CA (3, 1) | 'D' |
| (4, 1) | 4 | 3 | CA (4, 1) | 'I' |
| (5, 1) | 5 | 8 | CA (5, 1) | 'O' |
| ⋮ | ⋮ | ⋮ | ⋮ | |

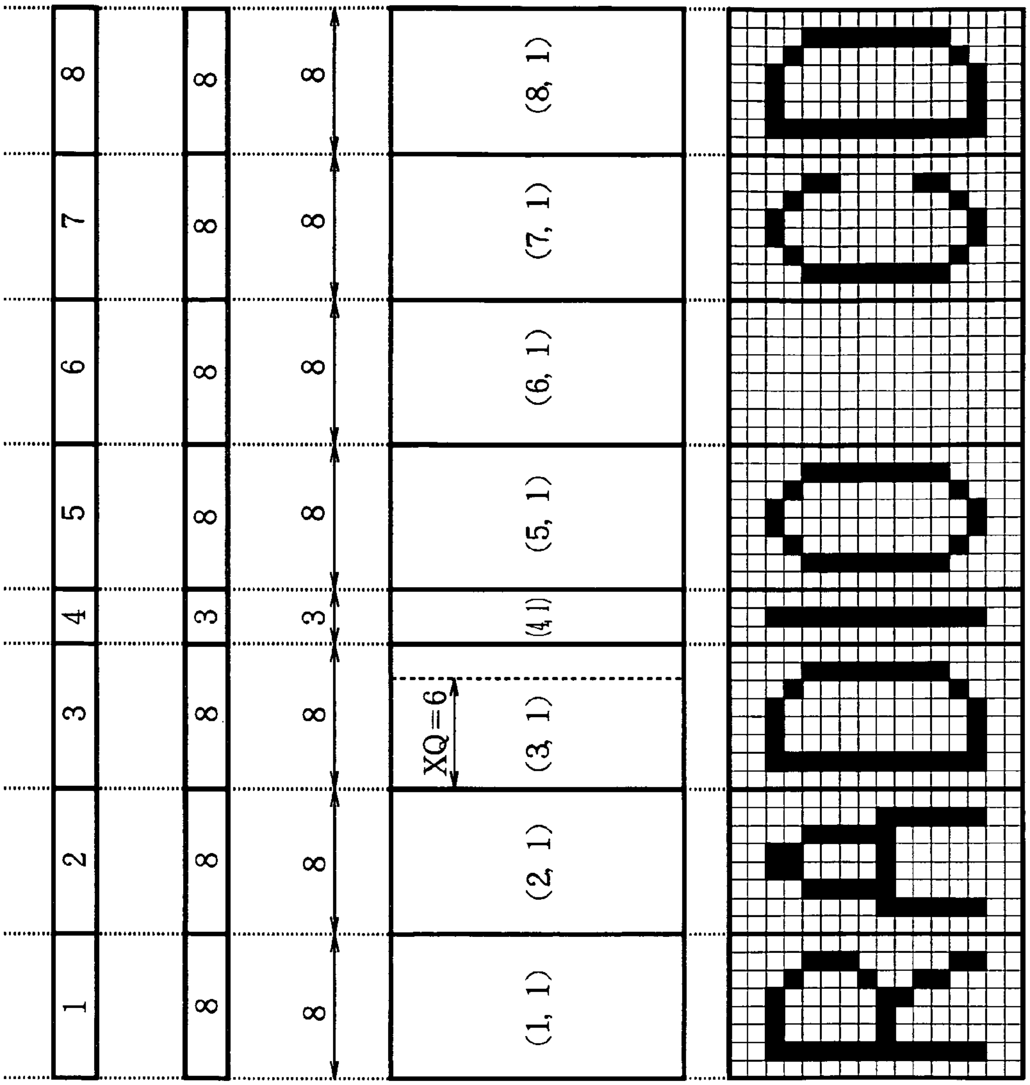
FIG.7(A) HORIZONTAL CHARACTER POSITION XP
FIG.7(B) CHARACTER WIDTH CW
FIG.7(C) PIXEL WIDTH
FIG.7(D) CHARACTER POSITION P(XP, YP)
FIG.7(E) DISPLAYED CHARACTERS

| CHARACTER CODE CC | CHARACTER PATTERN |
|---|---|
| 1 | PAT(1) |
| 2 | PAT(2) |
| 3 | PAT(3) |
| 4 | PAT(4) |
| 5 | PAT(5) |
| ...... | ...... |
| 512 | PAT(512) |

| COLOR CODE CLC | COLOR DATA CLD |
|---|---|
| 1 | CLD(1) |
| 2 | CLD(2) |
| 3 | CLD(3) |
| 4 | CLD(4) |
| ⋮ | ⋮ |
| 256 | CLD(256) |

COLOR DATA CLD

| |
|---|
| R DATA |
| G DATA |
| B DATA |

FIG.14

| CHARACTER POSITION P (XP, YP) | CHARACTER CONTROL CODE CTD | | | |
|---|---|---|---|---|
| | CHARACTER CODE CC | CHARACTER WIDTH CW | POSITION RESET CODE RST | CHARACTER ATTRIBUTE INFORMATION CA |
| (1 ,1) | 1 | 8 | 0 | CA (1, 1) |
| (2, 1) | 2 | 8 | 0 | CA (2, 1) |
| (3, 1) | 3 | 8 | 0 | CA (3, 1) |
| (4, 1) | 4 | 3 | 0 | CA (4, 1) |
| (5, 1) | 5 | 8 | 0 | CA (5, 1) |
| (6, 1) | 6 | 8 | 0 | CA (6, 1) |
| (7, 1) | 7 | 8 | 1 | CA (7, 1) |
| (8, 1) | 3 | 8 | 0 | CA (8, 1) |
| ...... | ...... | ...... | ...... | |

| CHARACTER |
|---|
| 'R' |
| 'A' |
| 'D' |
| 'I' |
| 'O' |
| ' ' |
| 'C' |
| 'D' |

FIG.16(A) STANDARD HORIZONTAL CHARACTER POSITION XF

FIG.16(B) HORIZONTAL CHARACTER POSITION XP

FIG.16(C) CHARACTER WIDTH CW

FIG.16(D) POSITION RESET CODE RST

FIG.16(E) BLANK SIGNAL BLK

FIG.16(F) PIXEL WIDTH

FIG.16(G) CHARACTER POSITION P(XP, YP)

FIG.16(H) DISPLAYED CHARACTERS

IMAGE GENERATING APPARATUS AND METHOD, AND IMAGE DISPLAY APPARATUS AND METHOD

FIELD OF THE INVENTION

The present invention relates to an apparatus and method for generating proportional characters, which have different character widths, as image data, and an image display apparatus and method for displaying proportional characters.

BACKGROUND ART

An image generating method for displaying characters with varying character widths is disclosed in the following patent document. In the image generating method disclosed in this Patent Document 1, for each character, the width of a space to be inserted before the next character is specified, whereby characters are displayed with equal spaces between them (uniform character spacing).

Patent Document 1: Japanese Patent Application Publication No. 2003-208148 (p. 5, FIG. 3)

DISCLOSURE OF THE INVENTION

Problems to be Solved by the Invention

The conventional image generating method disclosed in the above patent document leads to a problem of reduced readability because, as it specifies the width of a space to be inserted after each character so as to provide uniform character spacing, it widens the spaces between characters and cannot produce a uniform narrow spacing.

The present invention addresses this problem, with the object of generating proportional characters as image data according to character width data specified for each character, thereby making it possible to display more readable proportional characters without undesirably wide spaces between them.

Means of Solution of the Problems

The present invention provides an image generating apparatus comprising: a character control code storage means for storing a character control code for each character display position, the character control code including a character code and character width data associated with the character code; a positional control means for reading the character control code for the current character display position from the character control code storage means and controlling an occurrence period of the current character display position based on the character width data in the character control code that was read and a preceding character display position; a character pattern storage means for outputting a character pattern corresponding to the character code in the character control code that was read; and an image outputting means for outputting image data representing a character shape based on the character pattern.

Effect of the Invention

The present invention enables the pixel width of each character position to be changed by controlling the pixel width of the displayed character and further enables proportional characters to be displayed with pixel widths varying from character to character by appropriately combining specified character codes and character width data.

BRIEF DESCRIPTION OF THE DRAWINGS

FIGS. 7(A) to 7(E) are drawings illustrating the horizontal operation of the positional control unit 4 in FIG. 3.

FIG. 14 is a drawing illustrating the operation of the character control code storage unit 5 in FIG. 13.

EXPLANATION OF REFERENCE CHARACTERS

1 image generator, 2 image combiner, 3 display unit, 4 positional control unit, 5 character control code storage unit, 6 character pattern storage unit, 7 color data storage unit, 8 data output unit, 9 standard position data generator, 10 positional control unit

BEST MODE OF PRACTICING THE INVENTION

First Embodiment

Figure 1:
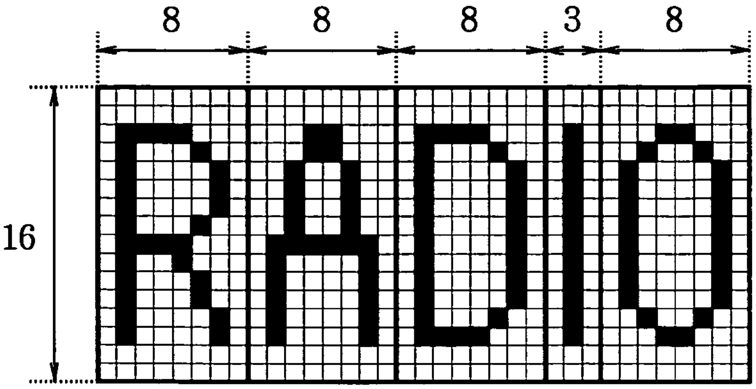
FIGS. 1(A) and 1(B) are drawings illustrating proportional characters.
Figure 1:
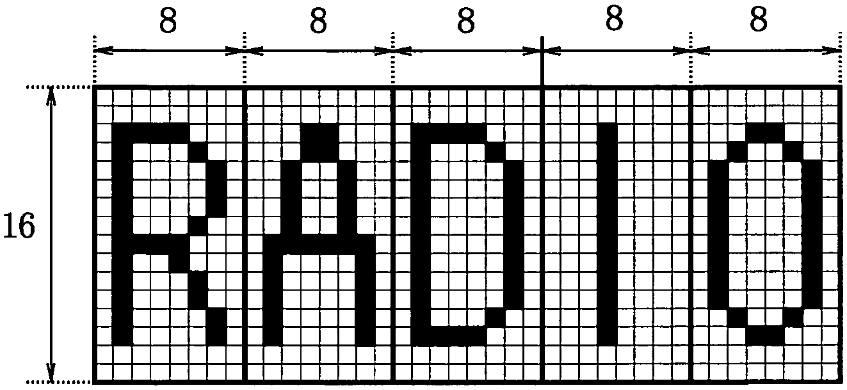

FIGS. 1(A) and 1(B) are drawings illustrating proportional characters; FIG. 1(A) shows an exemplary display of the word RADIO in proportional characters; FIG. 1(B) shows an exemplary display of RADIO in fixed width characters. All of the characters are assumed to be sixteen pixels high. The widths of the RADIO characters in FIG. 1(A) are eight pixels for R, A, D, and O, and three pixels for I. The character I has a horizontally narrow shape (narrow character width). Therefore, it is possible to prevent the space between adjacent characters from becoming too wide by reducing the number of pixels making up the width of the displayed character (also referred to as the character pixel width, or simply pixel width) according to the shape of the character. Characters displayed with pixel widths that vary according to the shapes of the characters in this way are referred to as proportional characters, or proportional text; they are displayed with equal spacing between adjacent characters, and have the advantages of improved readability and eye appeal.

The widths of all the RADIO characters in FIG. 1(B) are eight pixels. Because the character I having a horizontally narrow shape (narrow character width) is displayed with a width of eight pixels, the spaces between the character I and the adjacent characters are wider than the other spaces. Characters displayed with a fixed width irrespective of their shape are referred to as fixed-width characters or fixed-width text. The uniform character pixel width facilitates display control and can be implemented by a simple structure, but the varying spacing between adjacent characters has the disadvantages of poor readability and eye appeal.

Figure 2:
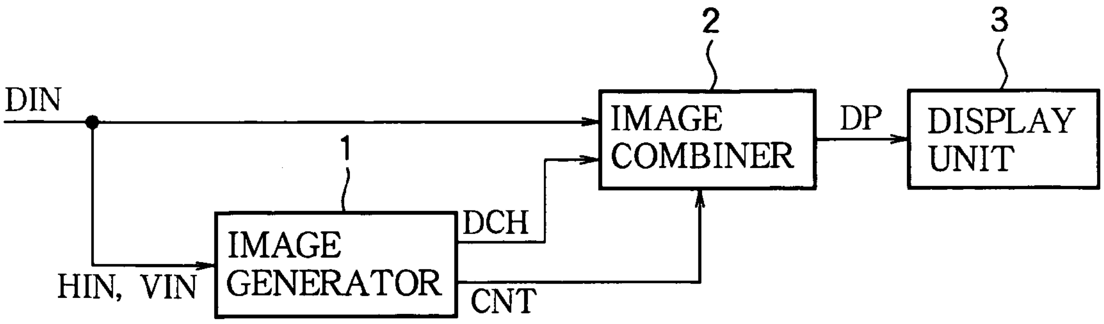
FIG. 2 is a diagram showing the structure of the image display apparatus in a first embodiment of the present invention.

FIG. 2 is a diagram showing the structure of the image display apparatus in a first embodiment of the present invention. The image display apparatus shown in FIG. 2 comprises an image generator 1, an image combiner 2, and a display unit 3.

Figure 3:
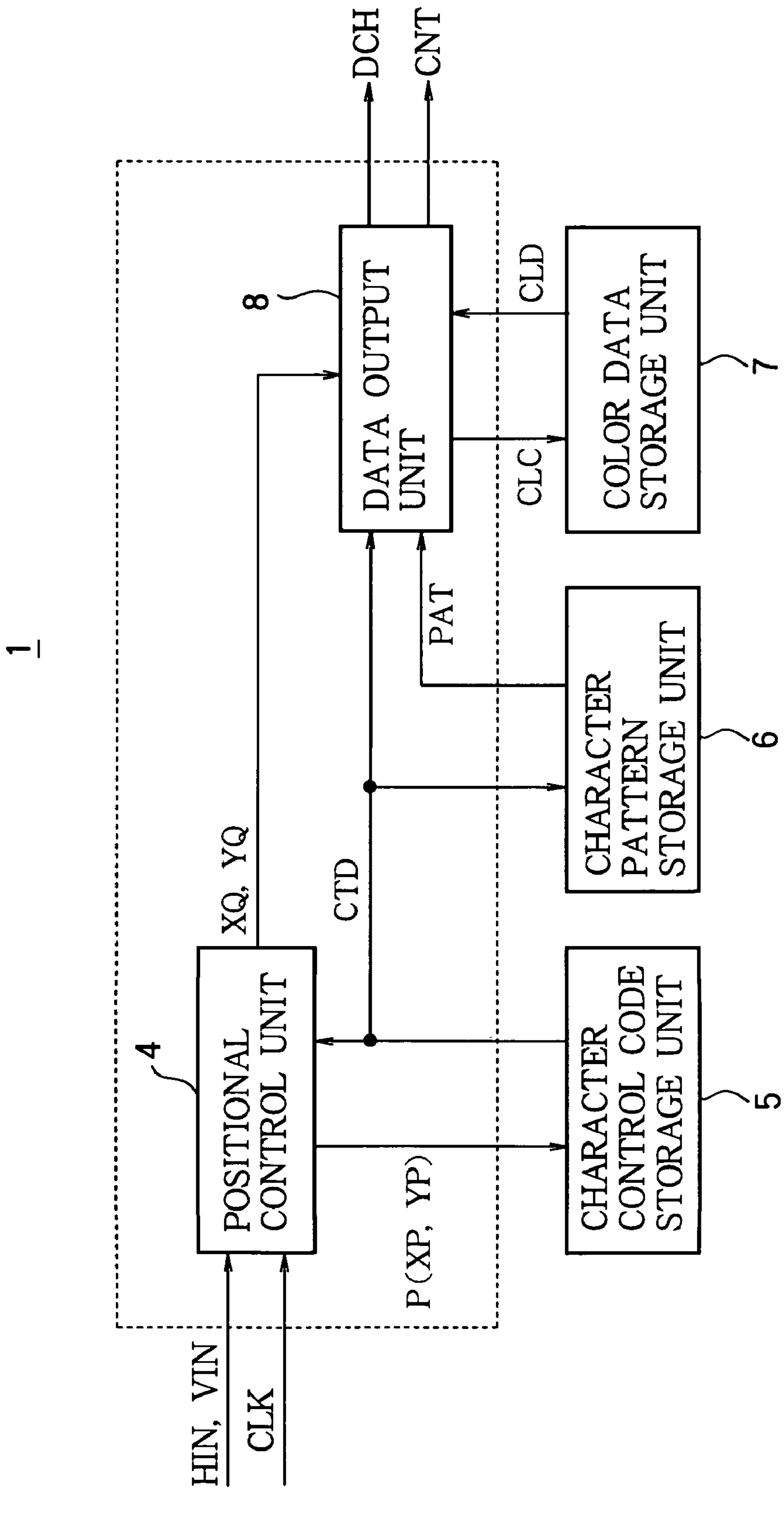
FIG. 3 is a diagram showing the structure of the image generator 1 in FIG. 2.

FIG. 3 is a diagram showing the structure of the image generator 1 in the first embodiment. The image generator 1 shown in FIG. 3 comprises a positional control unit 4, a character control code storage unit 5, a character pattern storage unit 6, a color data storage unit 7, and a data output unit 8.

The general operation will be described first.

In FIG. 2, an input image signal DIN is input to the image generator 1 and image combiner 2. The image generator 1 generates image data DCH, which will be described later. The image combiner 2 combines the input image data (DIN) and the image data DCH output by the image generating apparatus. The display unit 3 displays the image data combined by the image combiner 2. Instead of combining the image data, the display unit 3 may just display the image data DCH output by the image generator 1.

In FIG. 3, a horizontal synchronizing signal HIN and a vertical synchronizing signal VIN included in the input image signal DIN are input to the positional control unit 4. In addition, a character control code CTD read from the character control code storage unit 5 is input to the positional control unit 4.

In accordance with the input horizontal synchronizing signal HIN, the input vertical synchronizing signal VIN, the character control code CTD input from the character control code storage unit 5, and a pixel clock CLK, the positional control unit 4 outputs a character display position P (XP, YP), which indicates the display position of a character, and an intra-character horizontal pixel position XQ and an intra-row line position YQ, which indicate the position of a pixel in the character display position P (XP, YP).

The character display position P (XP, YP) is input to the character control code storage unit 5. The intra-character horizontal pixel position XQ and the intra-row line position YQ are input to the data output unit 8.

The character control code storage unit 5 stores character control codes indicating characters to be displayed on the screen and outputs a corresponding character control code CTD according to the input character display position P (the character display position P is given as an address, and the character control code CTD stored in the storage location specified by the address is read out). The character control code CTD is output to the positional control unit 4, character pattern storage unit 6, and data output unit 8.

The character pattern storage unit 6 outputs a character pattern PAT according to the input character control code CTD. The character pattern PAT is input to the data output unit 8.

The data output unit 8 generates a color code CLC for each pixel according to the input character pattern PAT, character control code CTD, intra-character horizontal pixel position XQ, and intra-row line position YQ, and outputs the color code to the color data storage unit 7.

The color data storage unit 7 reads color data CLD according to the input color code CLC and outputs the data to the data output unit 8.

The data output unit 8 outputs image data DCH (hereinafter referred to as character image data DCH) representing the character shape according to the input color data CLD and also outputs a combination control signal CNT according to the character pattern PAT and character control code CTD. The character image data DCH and combination control signal CNT are input to the image combiner 2 (see FIG. 2).

The image combiner 2 combines the input image data DIN and character image data DCH according to the combination control signal CNT and outputs combined image data DP. The combined image data DP are input to the display unit 3. The display unit 3 displays an image according to the combined image data DP.

The operation of each unit described above will now be described in further detail.

Figure 4:
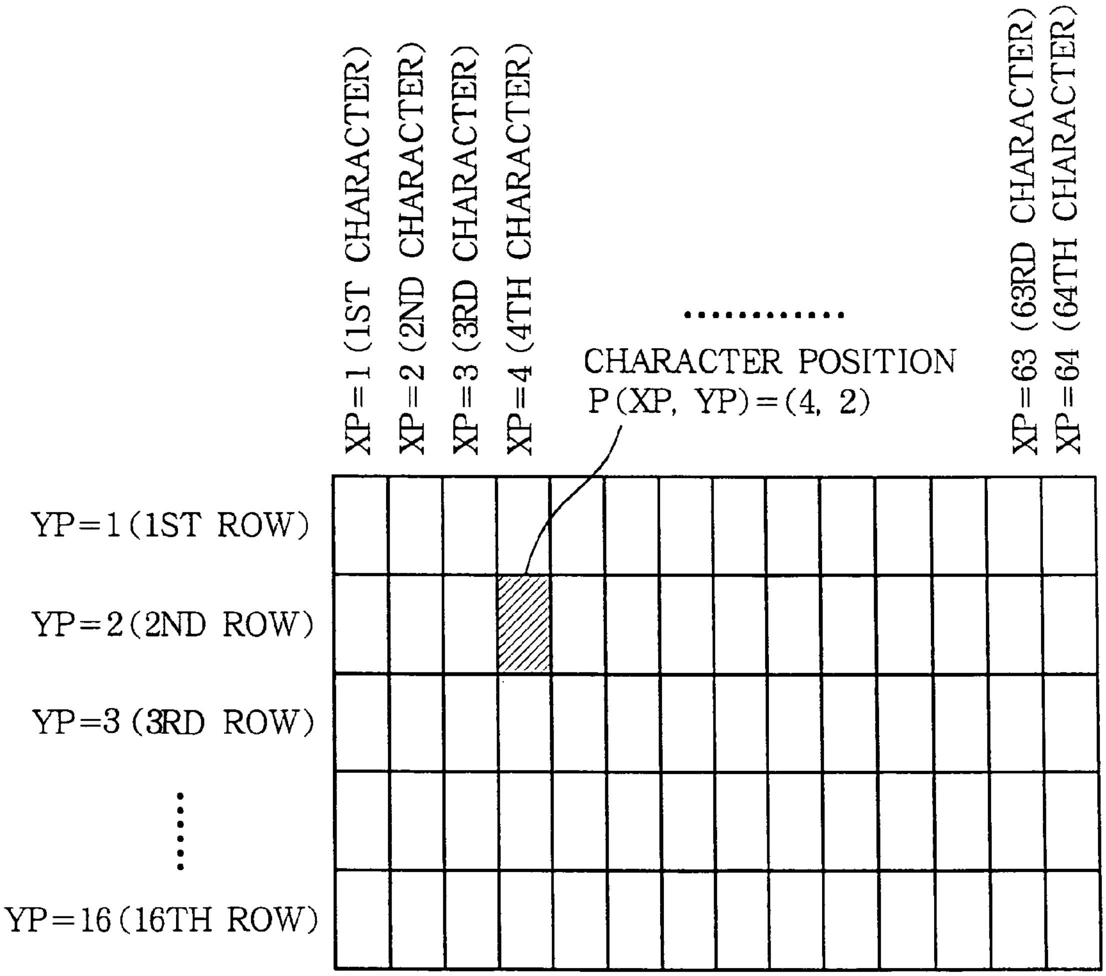
FIG. 4 is a drawing illustrating character positions in the first embodiment.

FIG. 4 is a drawing illustrating the relationship between the arrangement of characters and the character positions P (XP, YP). Horizontal position is represented by horizontal character position XP, and vertical position is represented by row position YP. The exemplary arrangement shown extends 64 characters in the horizontal direction and 16 rows in the vertical direction, including 1024 characters in all. The shaded position in FIG. 4, which is the fourth character in the second row, is represented as character position P (XP, YP)=(4, 2). Character position P (XP, YP) represents a place in the sequence of the characters and does not represent the display range on the screen.

Next the operation of the character control code storage unit 5 will be described.

Figures 5, 6:
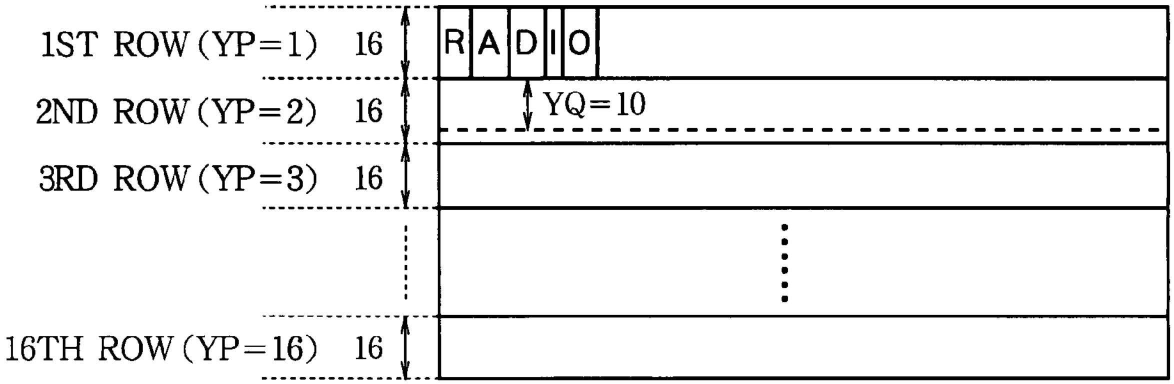
FIG. 5 is a drawing illustrating the operation of the character control code storage unit 5 in FIG. 3.
FIG. 6 is a drawing illustrating the vertical operation of the positional control unit 4 in FIG. 3.

FIG. 5 is a drawing illustrating character control codes CTD as stored in the character control code storage unit 5. A character control code CTD stored in the character control code storage unit 5 specifies what is to be displayed at a character position P (XP, YP).

The character control code CTD includes, for example, a character code CC, character width data CW, and character attribute information CA as shown in FIG. 5.

The character code CC is a code representing the character, such as CC=1 for R, CC=2 for A, CC=3 for D, CC=4 for I, and CC=5 for O.

The character width data CW indicate the pixel width of the character displayed in character position P (XP, YP); the character given by the character code CC is displayed with the pixel width specified by the corresponding character width data CW (the pixel width is also represented by the same reference character CW). In the example shown in FIG. 5, the character R corresponding to character code CC=1 is displayed at display position P=1 with a pixel width CW=8, and the character I corresponding to character code CC=4 is displayed at display position P=4 with a pixel width CW=3.

The character attribute information CA is information indicating how the character displayed in character position P (XP, YP) is to be displayed. The information includes, for example, the color code of the foreground color of the character, the color code of the background color of the character, and the border setting of the character.

The character code CC and the character width data CW can be specified independently of each other. However, to display proportional characters, which are displayed with equal character spacing, the character width data CW must be specified appropriately in association with the character represented by the character code CC.

The character control code CTD for a display position P (XP, YP) can be obtained from the character control code storage unit 5, as described above.

The operation of the positional control unit 4 will now be described.

FIG. 6 is a drawing illustrating the vertical operation of the positional control unit 4. In the example shown in FIG. 6, all of the sixteen rows have a width (height) of sixteen lines.

The positional control unit 4 counts lines according to the input vertical synchronizing signal VIN and the input horizontal synchronizing signal HIN, and sets the row position YP=1 when the count reaches the line at which the character display is to start. Lines are then counted with reference to the first line at which YP=1 (the first line in the first row), and the row position YP is changed from YP=1 to YP=2 when the number of lines reaches sixteen. The row position YP=1 is generated over an interval of sixteen lines.

YP=2 and subsequent row positions YP are obtained in a similar way, by incrementing the row position YP by one each time an interval of sixteen lines, which is the width of each row, has been counted.

The number of lines counted from the first line of the row is generated as the intra-row line position YQ. If the dotted line in the second row (YP=2) is the tenth line counted from the beginning of the second row, its position is indicated as YQ=10.

By obtaining the vertical character position YP and the intra-row line position YQ as described above, the positional control unit 4 recognizes the position of line YQ in row YP.

FIGS. 7(A) to 7(E) are drawings illustrating the horizontal operation of the positional control unit 4. FIG. 7(A) indicates horizontal character positions XP; FIG. 7(B) indicates character width data CW; FIG. 7(C) indicates pixel widths; FIG. 7(D) indicates character positions P (XP, YP); and FIG. 7(E) shows the displayed characters.

In the interval starting from row position YP=1, the positional control unit 4 counts horizontal pixel positions according to the input horizontal synchronizing signal HIN and the pixel clock CLK, and sets the horizontal character position XP to 1 when the count reaches the horizontal position at which the character display is to start. The positional control unit 4 outputs the character position P (XP, YP)=(1, 1) given by the row position YP=1 and horizontal character position XP=1. The character position P=(1, 1) is input to the character control code storage unit 5. The character control code CTD for character position P=(1, 1) is output from the character control code storage unit 5 and input to the positional control unit 4. According to the character width data CW=8 in the character control code CTD for character position P=(1, 1), the positional control unit 4 counts eight pixel clock cycles and generates the horizontal character position XP=1 over a period of eight pixels. Accordingly, the character position P (XP, YP)=(1, 1) is also generated for a period of eight pixels.

The positional control unit 4 then changes the horizontal character position XP from XP=1 to XP=2 and outputs the character position P (XP, YP)=(2, 1). The positional control unit 4 reads the character control code CTD for character position P=(2, 1) from the character control code storage unit 5 and obtains the character width data CW=8 for character position P=(2, 1). In accordance with the obtained character width data CW=8, the positional control unit 4 counts eight pixel clock cycles and generates the horizontal character position XP=2 for an eight-pixel period. Accordingly, the character position P (XP, YP)=(2, 1) is also generated for an eight-pixel period.

Subsequently, the positional control unit 4 repeats the same operation: after incrementing the horizontal character position XP by one, the positional control unit 4 obtains the character width data CW for character position P (XP, YP) from the character control code storage unit 5 and generates the character position P (XP, YP) for a period equivalent to the number of pixels indicated by the character width data CW.

By this operation, the character position P=(3, 1) is generated for an eight-pixel period according to the character width data CW=8 for character position P=(3, 1). Similarly, character position P (4, 1) is generated for a period of three pixels according to the character width data CW=3 for character position P=(4, 1), and character position P=(5, 1) is generated for a period of eight pixels according to the character width data CW=8 for character position P=(5, 1).

In that way, the positional control unit 4 can cause a character position P (XP, YP) to last for an interval matching the character width data CW stored in the character control code storage unit 5 for the corresponding character position P (XP, YP). In other words, the signal indicating each character position P (XP, YP) can be generated according to the character width data CW specified for character position P (XP, YP).

In addition, the positional control unit 4 generates an intra-character pixel position XP indicating horizontal pixel position referenced to the position where the horizontal character position XP changes. For example, in FIGS. 7(A) to 7(E), if the pixel position indicated by the dotted line in the period of horizontal character position XP=3 is the sixth pixel from the beginning of horizontal character position XP=3, then the indicated intra-character pixel position is XQ=6.

In other words, the positional control unit 4 can obtain a horizontal character position XP and an intra-character pixel position XQ indicating horizontal pixel position in the horizontal character position XP, and can recognize which pixel of which character corresponds to a given position in the image.

Since the operations described above are carried out in the horizontal and vertical directions, the positional control unit 4 can obtain the character position P (XP, YP), and the intra-character pixel position XQ and intra-row line position YQ indicating horizontal and vertical pixel positions in the character position P (XP, YP).

The character position P (XP, YP) output from the positional control unit 4 is input to the character control code storage unit 5, and the intra-character pixel position XQ and the intra-row line position YQ are input to the data output unit 8.

The operation of the character pattern storage unit 6 will now be described.

The character pattern storage unit 6 receives the character code CC included in the character control code CTD output from the character control code storage unit 5.

Figures 8A, 8B:
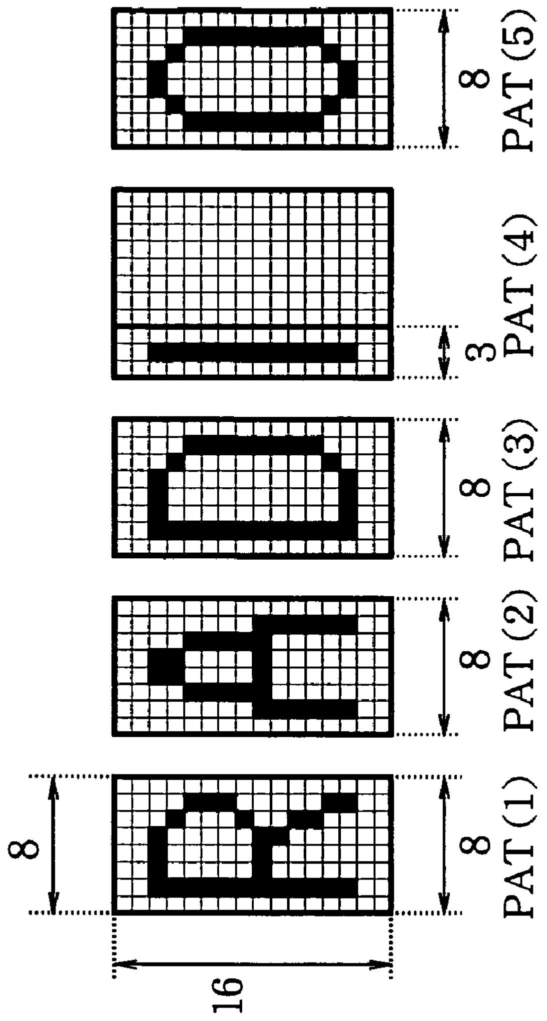
FIGS. 8(A) and 8(B) are drawings illustrating the operation of the character pattern storage unit 6 in FIG. 3.

FIGS. 8(A) and 8(B) are drawings illustrating the character pattern storage unit 6. FIG. 8(A) shows the relationship between character codes CC and character patterns PAT. In association with each character code CC, the character pattern storage unit 6 stores a character pattern PAT indicating the shape of the character. For example, a character pattern PAT(1) indicating the shape of the character R is stored for character code CC=1; a character pattern PAT(2) indicating the shape of the character A is stored for character code CC=2. Similarly, character pattern PAT(3), indicating the shape of the character D, is stored for CC=3; character pattern PAT(4), indicating the shape of the character I, is stored for CC=4; character pattern PAT(5), indicating the shape of the character O, is stored for CC=5.

FIG. 8(B) shows examples of these character patterns. The pixels in the character patterns shown in FIG. 8(B) are assumed to have binary values, such as black indicating the foreground part of the character and white indicating the background part of the character. Such data can indicate the shapes of characters.

As shown in FIG. 8(B), the character patterns PAT have a fixed size of sixteen pixels in the vertical direction and eight pixels in the horizontal direction. The shape of the character pattern is left-justified within the fixed size. In the example of the character control code CTD shown in FIG. 5, the character width data for R, A, D, and O are set to '8', and the character width data for 1 are set to '3'. As shown in FIG. 8(B), the characters R, A, D, and O having character width data of '8' are expressed by using all the pixels of the character pattern, and the character I having character width data of '3' uses the leftmost three pixels in each line, leaving the remaining five pixels to the right unused.

The character pattern PAT is left-justified within the size of the character pattern, as described above.

As the example of the character pattern I shows, the size of the character pattern is fixed irrespective of the character width data CW. Accordingly, the storage address of the character pattern can be calculated by simple multiplication of the size of the character pattern and the character code.

The character pattern storage unit 6 generates the character pattern PAT corresponding to the character code CC and outputs it to the data output unit 8.

The operation of the color data storage unit 7 will now be described.

Figures 9A, 9B, 10:
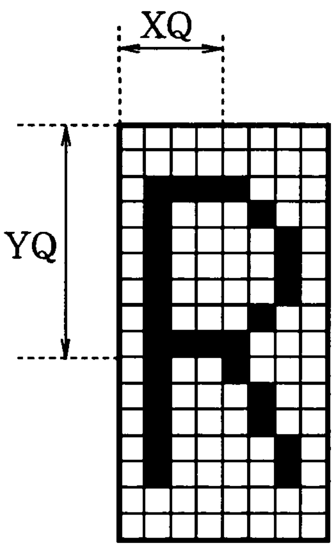
FIGS. 9(A) and 9(B) are drawings showing the structure of the color data storage unit 7 in FIG. 3.
FIG. 10 is a drawing illustrating the operation of the data output unit 8 in FIG. 3.

FIGS. 9(A) and 9(B) are drawings illustrating color data CLD stored in the color data storage unit 7.

FIG. 9(A) shows the relationship between the color code CLC and the color data CLD; in the example shown in FIG. 9(A), the color data storage unit 7 stores color data CLD(1) to CLD(256) for 256 colors corresponding to the color codes CLC=1 to 256 of the 256 colors. For example, color data CLD(1) are output for color code CLC=1, and color data CLD(256) are output for color code CLC=256.

FIG. 9(B) shows the constituent elements of the color data CLD. The color data CLD include data for three colors, such as R (red), G (green), and B (blue).

The color data storage unit 7 outputs the three-color (RGB) color data CLD corresponding to the color code CLC.

The operation of the data output unit 8 will now be described.

The data output unit 8 receives the intra-character pixel position XQ and the intra-row line position YQ output from the positional control unit 4, the color control code CTD output from the character control code storage unit 5, and the character pattern PAT output from the character pattern storage unit 6.

FIG. 10 is a drawing illustrating the relationship between the character pattern PAT and the intra-character pixel position XQ and intra-row line position YQ input to the data output unit. A pixel position in the character pattern PAT can be identified by its intra-character pixel position XQ and intra-row line position YQ. The data output unit 8 decides whether the identified pixel position is in the foreground part or the background part of the character pattern by referring to the value of character pattern at the pixel position.

Figure 11A:
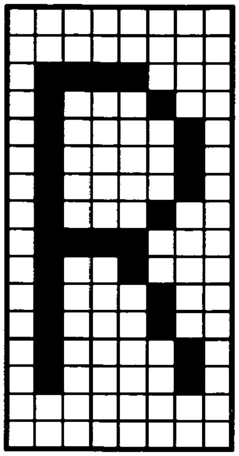
FIGS. 11(A) and 11(B) are drawings illustrating the operation of the data output unit 8 in FIG. 3.
Figure 11B:
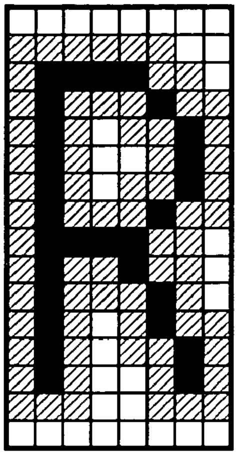

FIGS. 11(A) and 11(B) are drawings illustrating a border of a character, as an example of character attribution. FIG. 11(A) shows the basic character pattern, and FIG. 11(B) shows the character displayed with a border. In FIG. 11(A), the pixels in the foreground part of the character are shown in black, and the pixels in the background part are shown in white. If the foreground part is bordered by one pixel above, below, and to the left and right, the shaded part of FIG. 11(B) corresponds to the pixels in the border.

The color code CLC is output as follows: for a pixel in the foreground part of the character, a foreground color code specified in the character attribute information included in the character control code CTD is output; for a pixel in the border part of the character, a border color code specified in the character attribute information is output; for a pixel in the background part, excluding the border part, a background color code specified in the character attribute information is output.

The data output unit 8 outputs the color codes CLC corresponding to the foreground part, background part, and border part, according to the character pattern PAT and the character control code CTD.

The data output unit 8 reads and obtains the color data CLD, corresponding to the output color code CLC, from the color data storage unit 7, and outputs the obtained color data CLD as character image data DCH. If a particular color code such as CLC=256 is specified beforehand as a transparent color, a combination control signal CNT indicating that the corresponding image data is in the transparent color is output for pixels having the color code CLC=256, irrespective of the value read as the color data CLD(256). For example, the combination control signal CNT may be set to '0' to indicate the transparent color and set to '1' to indicate a non-transparent color.

In accordance with the character control code specified for each character position P (XP, YP), the image generator 1 can change the pixel width of each character position and can output proportional characters having different pixel widths as image data by combining the character codes and the character width data appropriately.

The image data DCH and the combination control signal CNT output from the data output unit 8 are input to the image combiner 2.

Next the operation of the image combiner 2 will be described.

The image combiner 2 receives the input image data DIN and the character image data DCH and combination control signal CNT output from the image generator 1.

Figure 12A:
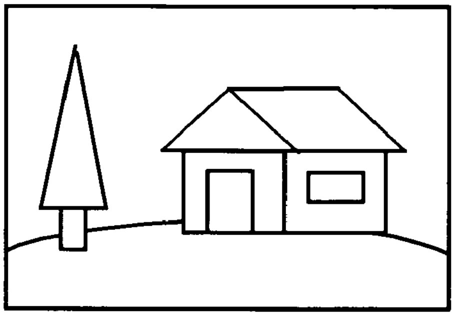
FIGS. 12(A) to 12(D) are drawings illustrating the operation of the image combiner in FIG. 2.
Figure 12B:
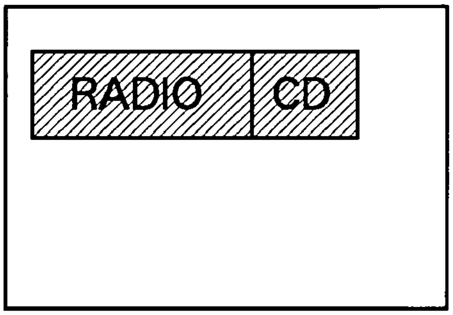
Figure 12C:
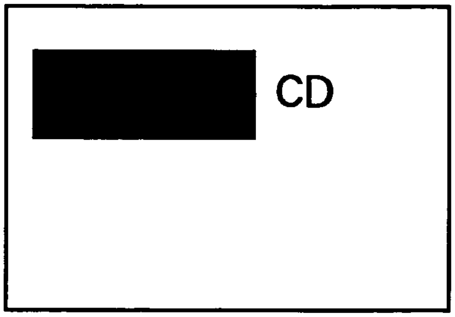
Figure 12D:
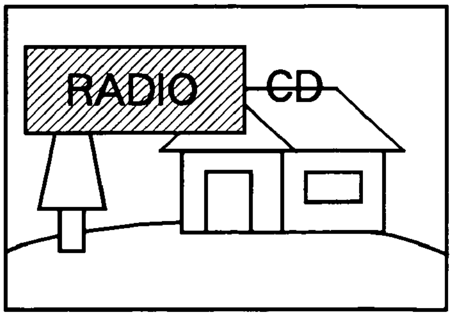

FIGS. 12(A) to 12(D) are drawings illustrating the operation of the image combiner 2. FIG. 12(A) shows the input image data DIN; FIG. 12(B) shows the image data DCH output from the image generator 1; FIG. 12(C) shows the combination control signal CNT output from the image generator 1; FIG. 12(D) shows the combined image data DP.

In the character image data DCH shown in FIG. 12(B), the solid lines constituting the characters in the words RADIO and CD have the color data of the foreground part specified for each character position P (XP, YP). The rectangular areas around the characters have the color data of the background specified for each character position P.

The combination control signal CNT shown in FIG. 12(C) is set to '1' (non-transparent) in the part displayed in black and '0' (transparent) in the part displayed in white. The combination control signal CNT is generated according to the shapes in the character image data DCH in (B). The signal generated in this example makes the characters CD and the rectangular area including the word RADIO non-transparent and all the rest transparent.

As shown in FIG. 12(D), the character image data DCH from the image generator 1 are selected in the non-transparent areas indicated by the combination control signal (CNT=1), and the input image data DIN are selected in the transparent areas indicated by the combination control signal (CNT=0). As a result, combined image data DP are generated such that the characters CD and the rectangular area containing the word RADIO are overlaid on the image drawn by the input image data DIN.

As described above, the image combiner 2 can overlay text given by the character image data DCH on the input image DIN according to the combination control signal CNT.

The combined image data DP are input to the display unit 3, and the display unit 3 displays an image according to the combined image data DP.

The image display apparatus of the first embodiment can change the pixel width in each character position by specifying the character code and the character width data in each character position and controlling the pixel width of the character to be displayed according to the character width data specified in each character position and can also display proportional characters having different pixel widths by combining the specified character code and the character width data appropriately.

The character pattern PAT in the example described above has two pixel values, one indicating the foreground part and one indicating background part of the character, but the character pattern may have three or more values. In that case, three or more colors can be used in the area of one character, making it possible to provide a higher-grade character display by displaying, say, multicolored characters or characters with smooth edges.

Instead of having a transparent color assigned to a particular color code as in the example described above, a transmittance value may be assigned to each color code. In that case, the image combiner 2 can display translucent characters by taking a weighted average value of the input image data DIN and the character image data DCH from the image generator 1, using weights corresponding to the transmittance.

Second Embodiment

Figure 13:
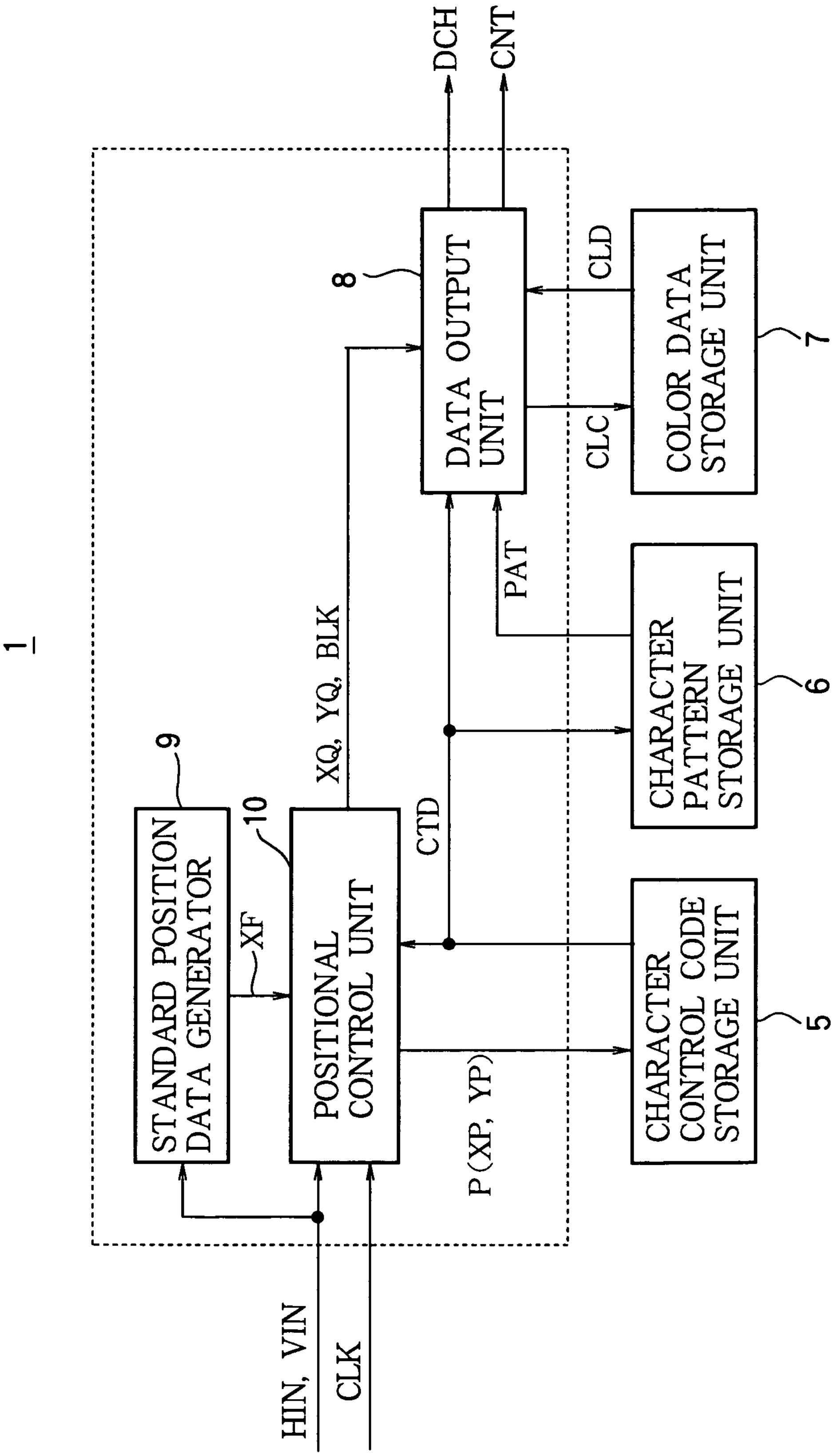
FIG. 13 is a diagram showing the structure of the image generator 1 in a second embodiment of the present invention.

FIG. 13 shows the image generator 1 in a second embodiment of the present invention. The image generator 1 includes a character control code storage unit 5, a character pattern storage unit 6, a color data storage unit 7, a data output unit 8, a standard position data generator 9, and a positional control unit 10.

First the general operation of the image generator 1 will be described.

The input horizontal synchronizing signal HIN and the input vertical synchronizing signal VIN are input to the standard position data generator 9 and the positional control unit 10. The standard position data generator 9 generates standard horizontal character positions XF indicating the horizontal positions of fixed-width characters (obtained as the product of the number of characters generated in the same horizontal row and a fixed pixel width) according to the input synchronizing signal HIN and outputs these standard positions to the positional control unit 10. The positional control unit 10 outputs character positions P (XP, YP), intra-character pixel positions XQ, intra-row line positions YQ, and a blank signal BLK indicating a space between characters, according to the input horizontal synchronizing signal HIN, the input vertical synchronizing signal VIN, the standard horizontal character positions XF, and character control codes CTD input from the character control code storage unit 5. The character positions P (XP, YP) are input to the character control code storage unit 5, and the intra-character pixel positions XQ, intra-row line positions YQ, and blank signal BLK are input to the data output unit 8.

The character control code storage unit 5 outputs character control codes CTD corresponding to the input character positions P (XP, YP). The character control codes CTD are input to the positional control unit 4, character pattern storage unit 6, and data output unit 8.

The character pattern storage unit 6 outputs character patterns PAT corresponding to the character codes CC in the input character control codes CTD. The character patterns PAT are input to the data output unit 8.

The data output unit 8 generates a color code CLC for each pixel according to the input character pattern PAT, character control code CTD, intra-character horizontal pixel position XP, and intra-row line position YP, and outputs the code to the color data storage unit 7.

In accordance with the input color code CLC, the color data storage unit 7 outputs the corresponding color data CLD to the data output unit 8.

The data output unit 8 outputs image data DCH representing the character shape (and thus referred to as character image data DCH) according to the input color data CLD, and also outputs a combination control signal CNT according to the character pattern PAT and character control code CTD.

The operation of each unit will now be described in further detail.

The operation of the character control code storage unit 5 will be described first.

FIG. 14 is a drawing illustrating character control codes CTD as stored in the character control code storage unit 5. As in the example shown in FIG. 5, the character control code storage unit 5 stores a character control code CTD specifying what is to be displayed at each character position P (XP, YP). In the example shown in FIG. 14, the character control code CTD includes a character code CC, character width data CW, a positional reset code RST, and character attribute information CA.

The character code CC, character width data CW, and character attribute information are as described in the first embodiment with reference to FIG. 5; repeated descriptions will be omitted.

Figure 15:
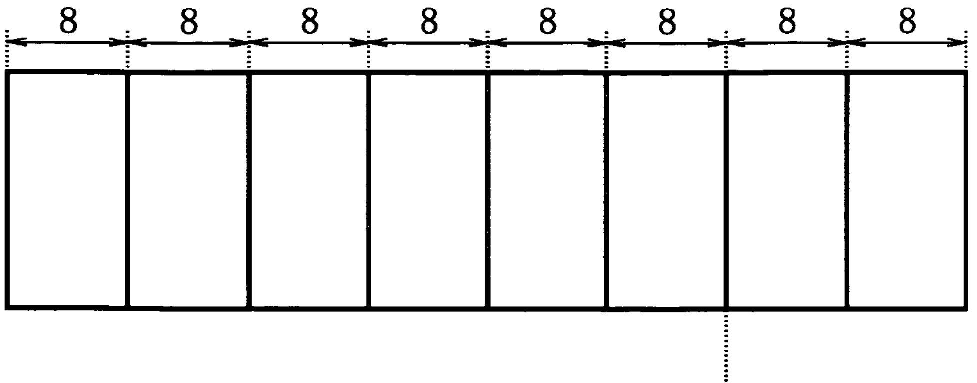
FIGS. 15(A) to 15(C) are drawings illustrating the positional reset code RST in the second embodiment.
Figure 15:
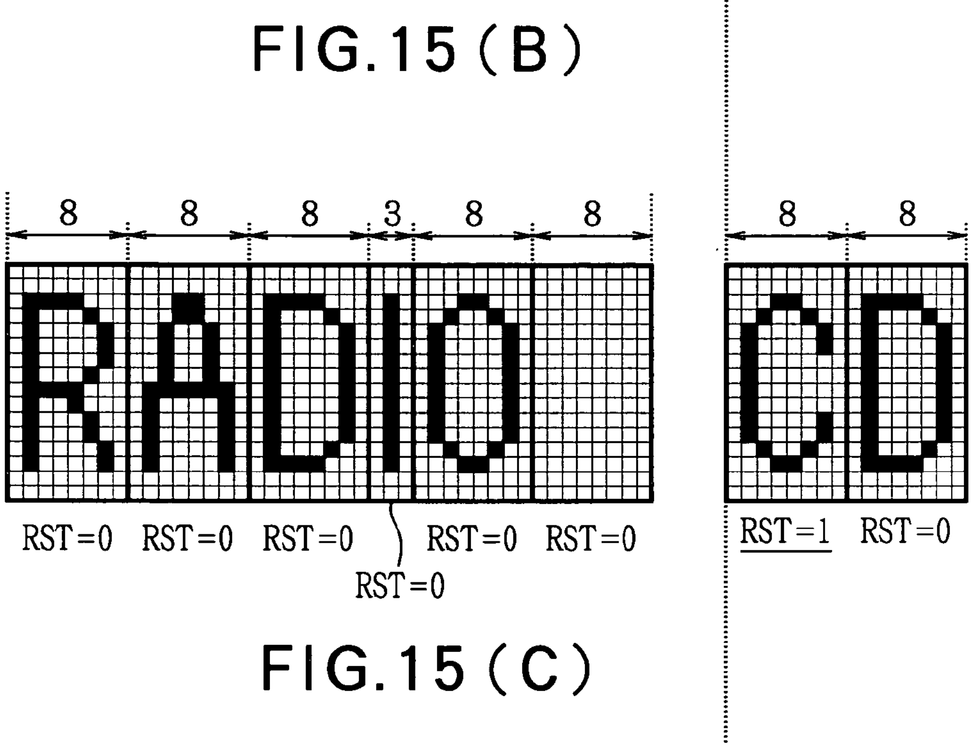
Figure 15:
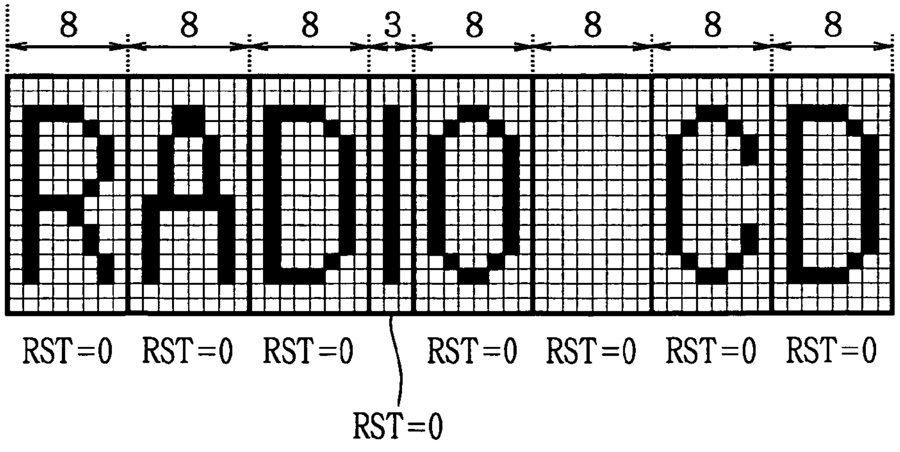

The positional reset code RST is a control code for initializing the horizontal character display position to a predetermined position (a position at which a character would be displayed if the characters were generated with a fixed pixel width). FIGS. 15(A) to 15(C) are drawings illustrating the function of the positional reset code RST. FIG. 15(A) shows character display positions with a fixed width of eight pixels. FIG. 15(B) shows proportional characters displayed by using the positional reset code RST. FIG. 15(C) shows the proportional characters displayed without using the positional reset code (RST).

First consider FIG. 15(C). The character ‘I’ has a width of three pixels. The display positions of the following ‘O’, ‘ ’ (space), ‘C’, and ‘D’ are shifted to the left (forward) by five pixels in comparison with the fixed-width character display positions shown in FIG. 15(A).

Next suppose that the positional reset code RST=1 is assigned to the ‘C’ in FIG. 15(B). As in FIG. 15(C), the characters ‘O’ and ‘ ’ (space) following the ‘I’ are shifted five pixels to the left with reference to the fixed-width display positions shown in FIG. 15(A), but the character ‘C’ having the positional reset code RST=1 is not adjacent to the preceding character ' ' (space); instead, it is displayed in the fixed-width display position shown in FIG. 15(A). The 'D' following the 'C' is displayed next to the 'C' because RST=0.

The positional reset code RST is a control code indicating whether the character position should be reset or not; more specifically, it indicates whether the character in each position P (XP, YP) is to be displayed in a fixed-width character position or aligned next to the preceding character. As will be described in further detail, the positional control unit 10 selects whether the display start position of the current character is determined with reference to the display end position of the preceding character or is set to a predetermined standard position, according to the character positional reset code RST in the character control code read from the character control code storage unit 5. For example, those of the reset codes that are associated with characters following particular characters may be codes demanding a reset; when the reset code RST is a code demanding a reset, the positional control unit 10 starts the display of the current character at a standard position specified by the data representing standard positions. The particular characters may include, for example, the space ' ', colon ':', and semicolon ';'.

The character control code storage unit 5 stores a character control code CTD including a character code CC, character width data CW, a positional reset code RST, and attribute information CA for each display position P (XP, YP) and outputs the character control code CTD for the input display position P (XP, YP).

FIGS. 16(A) to 16(H) are drawings illustrating the operation of the standard position data generator 9 and positional control unit 10. The operation of the standard position data generator 9 will be described first. The standard position data generator 9 counts horizontal pixel positions according to the input horizontal synchronizing signal HIN and the pixel clock CLK and sets the standard horizontal character position XF to 1 when the count reaches the horizontal position at which the character display is to start. After counting a period of eight pixels corresponding to a fixed width of eight pixels, the positional control unit 4 changes the standard horizontal character position XF from XF=1 to XF=2. This causes the standard horizontal character position XF=1 to be generated over a period of eight pixels. The standard horizontal character positions XF generated subsequently increase by one every eight pixels.

The standard horizontal character positions XF output from the standard position data generator 9 are input to the positional control unit 10.

Next the operation of the positional control unit 10 will be described.

The vertical operation of the positional control unit 10 is the same as the vertical operation of the positional control unit 4 described in the first embodiment with reference to FIG. 6; a repeated description will be omitted. The positional control unit 10 outputs the vertical character position YP and the intra-row line position YQ.

The horizontal operation of the positional control unit 10 will now be described.

Figure 16:
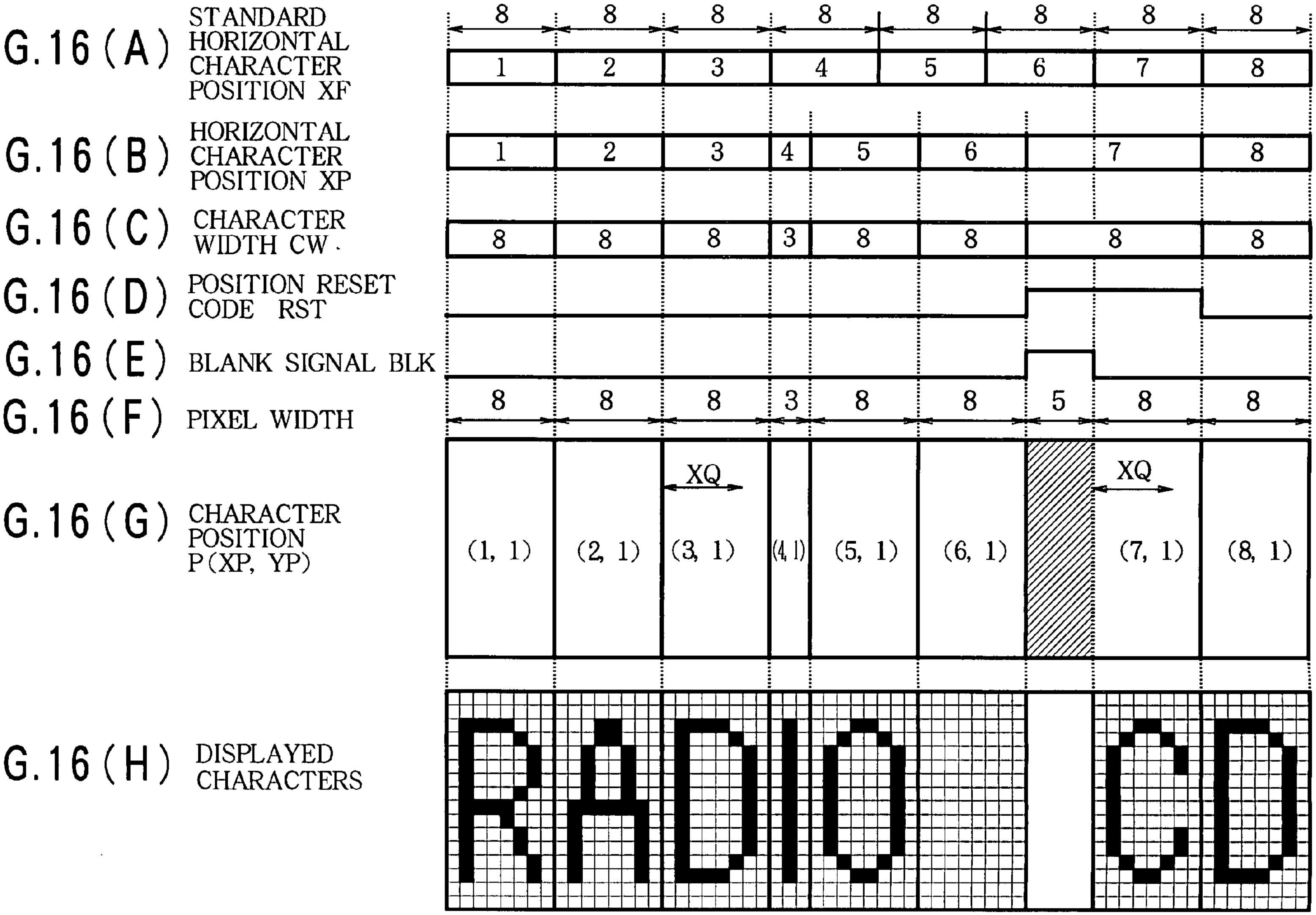
FIGS. 16(A) to 16(H) are drawings illustrating the horizontal operation of the positional control unit 10 in FIG. 13.

FIG. 16(B) indicates horizontal character positions XP; FIG. 16(C) indicates character width data CW; FIG. 16(D) indicates the positional reset code RST; FIG. 16(E) indicates the blank signal BLK; FIG. 16(F) indicates pixel widths; FIG. 16(G) indicates character positions P (XP, YP); FIG. 16(H) shows the displayed characters.

In the interval starting from row position YP=1, the positional control unit 10 counts horizontal pixel positions according to the input horizontal synchronizing signal HIN and the pixel clock CLK, and sets the horizontal character position XP to 1 when the count reaches the horizontal position at which the character display is to start. The positional control unit 10 outputs the character position P (XP, YP)=(1, 1), given by the row position YP=1 and the horizontal character position XP=1. The horizontal position P=(1, 1) is input to the character control code storage unit 5. The character control code CTD for character position P=(1, 1) is output from the character control code storage unit 5 and input to the positional control unit 10. The positional control unit 10 obtains the positional reset code RST=0 and character width data CW=8 from the character control code CTD for character position P (1, 1). When the positional reset code RST is 0, the positional control unit 10 sets the blank signal BLK to 0, counts eight cycles of the pixel clock CLK according to the character width data CW=8, and generates the horizontal character position XP=1 over an eight-pixel period. The character position P (XP, YP)=(1, 1) is thereby generated for an eight-pixel period.

The positional control unit 10 then changes the horizontal character position XP from XP=1 to XP=2 and outputs the character position P (XP, YP)=(2, 1). The positional control unit 10 reads the character control code CTD for character position P=(2, 1) from the character control code storage unit 5 and obtains the positional reset code RST=0 and character width data CW=8 for character position P=(2, 1). Because the positional reset code RST obtained here is again 0, the blank signal BLK is set to 0, and the horizontal character position XP=2 is generated over an eight-pixel period matching the obtained character width data CW=8. The character position P (XP, YP)=(2, 1) is thereby generated for an eight-pixel period.

The positional control unit 10 continues to perform similar operations, incrementing the horizontal character position XP by one, obtaining the character width data CW for the character position P (XP, YP) from the character control code storage unit 5, setting the blank signal BLK to 0 according to the positional reset code (RST=0), and generating the character position P (XP, YP) over the pixel period indicated by the character width data CW.

These operations generate character position P=(3, 1) for an eight-pixel period matching the character width data CW=8 specified for character position P=(3, 1). Similarly, character position P=(4, 1) is generated for a three-pixel period matching the character width data CW=3 specified for character position P=(3, 1). Character positions P=(5, 1) and P=(6, 1) are generated for periods of eight pixels, matching the character width data CW=8 specified for character positions P=(5, 1) and P=(6, 1). The blank signal BLK remains BLK=0.

Next, the positional control unit 10 changes the horizontal character position XP from XP=6 to XP=7 and outputs the character position P (XP, YP)=(7, 1). The positional control unit 10 reads the character control code CTD for character position P=(7, 1) from the character control code storage unit 5 and obtains the positional reset code RST=1 and the character width data CW=8 for character position P=(7, 1).

When the positional reset code is asserted (RST=1), the blank signal is asserted (BLK=1). At this time, the standard horizontal character position XF shown in FIG. 16(A) is XF=6. When the standard horizontal character position XF shown in FIG. 16(A) becomes XF=7, which is equal to the horizontal character position XP=7 shown in FIG. 16(B), the blank signal is changed from BLK=1 to BLK=0. Because the character I in character position P (XP, YP)=(4, 1) has a width of three pixels, the subsequent character positions P are shifted by five pixels, so that the blank signal is asserted (BLK=1) over a five-pixel period.

The positional control unit 10 does not count pixel width while the blank signal is asserted (BLK=1); instead, it starts counting the eight-pixel period corresponding to the obtained character width data CW=8 when the blank signal changes to BLK=0. The character position P=(7, 1) is generated during the five-pixel period during which the blank signal is asserted (BLK=1) and the eight-pixel period obtained by counting, that is, during a period of thirteen pixels in total.

The positional control unit 10 then changes the horizontal character position XP from XP=7 to XP=8 and outputs the character position P (XP, YP)=(8, 1).

After this, the positional control unit 10 repeats the same operation.

The positional control unit 10 generates a character position P (XP, YP) for the pixel period specified by the character width data CW stored for character position P (XP, YP) in the character control code storage unit 5, and can align this period of occurrence of the character position P (XP, YP) with a standard horizontal character position XF, responsive to the positional reset code RST. When the positional reset code is asserted (RST=1), the positional control unit 10 can also indicate a space between characters with the blank signal (BLK=1).

The positional control unit 10 also generates the intra-character pixel position XQ indicating the horizontal pixel position with reference to the position where the character display starts in the character position P (XP, YP). As shown at P (XP, YP)=(3, 1), when the positional reset code is not asserted (RST=0), the pixel position XQ is generated with reference to the position where the horizontal character position XP changes from XP=2 to XP=3. As shown at P (XP, YP)=(7, 1), when the positional reset code is asserted (RST=1), the pixel position XQ is generated with reference to the position where the blank signal BLK changes from BLK=1 to BLK=0.

The positional control unit 10 can thus obtain a horizontal character position XP, an intra-character pixel position XQ indicating horizontal pixel position in the horizontal character position XP, and a blank signal BLK generated when the positional reset code is asserted (RST=1) to indicate a space between characters, and can recognize whether a given position in an image is in a space between characters or, if that is not the case, can recognize which pixel in which character the given position represents.

The character position P (XP, YP) output from the positional control unit 10 is input to the character control code storage unit 5, and the intra-character pixel position XQ, intra-row line position YQ, and blank signal BLK are input to the data output unit 8.

The character pattern storage unit 6 and color data storage unit 7 operate as described in the first embodiment; repeated descriptions will be omitted.

The operation of the data output unit 8 will now be described.

The data output unit 8 receives the intra-character pixel position XQ, intra-row line position YQ, and blank signal BLK output from the positional control unit 10, the character control code CTD output from the character control code storage unit 5, and the character pattern PAT output from the character pattern storage unit 6.

When the blank signal BLK is asserted (BLK=1), the corresponding pixel is in a space between characters. In that case, the data output unit 8 outputs a predetermined inter-character space color code as the color code CLC.

When the blank signal BLK is not asserted (BLK=0), the data output unit 8 operates as described below.

FIG. 10 is a drawing illustrating the relationship between the character pattern PAT and the intra-character pixel position XQ and intra-row line position YQ input to the data output unit. The intra-character pixel position XQ and the intra-row line position YQ specify a horizontal position and a vertical position in the character pattern PAT. The data output unit 8 decides from the character pattern PAT whether the pixel position indicated by the intra-character pixel position XQ and intra-row line position YQ is in a foreground part or background part of the character.

FIGS. 11(A) and 11(B) are drawings illustrating a border of a character, as an example of character attribution. FIG. 11(A) shows the basic character pattern, and FIG. 11(B) shows the character displayed with a border. In FIG. 11(A), the pixels in the foreground part of the character are shown in black, and the pixels in the background part are shown in white. If the foreground part is bordered by one pixel above, below, and to the left and right, the shaded part of FIG. 11(B) corresponds to the pixels in the border.

The color code CLC is output as follows: For a pixel in the foreground part of the character, a foreground color code specified in the character attribute information included in the character control code CTD is output; for a pixel in the border part of the character, a border color code specified in the character attribute information is output; for a pixel in the background part, excluding the border part, a background color code specified in the character attribute information is output.

The data output unit 8 outputs the color codes CLC corresponding to inter-character spaces, foreground, background, and borders according to the blank signal BLK, character pattern PAT, and character control code CTD.

The data output unit 8 reads and obtains the color data CLD corresponding to the output color code CLC from the color data storage unit 7, and outputs the obtained color data CLD as character image data DCH. If a particular color code such as CLC=256 is specified beforehand as a transparent color, a combination control signal CNT indicating that the corresponding image data are in the transparent color is output for pixels having the color code CLC=256, irrespective of the value read as the color data CLD(256). For example, the combination control signal CNT may be set to ‘0’ to indicate the transparent color and set to ‘1’ to indicate a non-transparent color.

The character control code specified for each character position P (XP, YP) enables the image generator 1 to output proportional characters having different pixel widths as character image data. The color and attributes of the proportional characters can be varied in each character position P (XP, YP).

Figure 17:
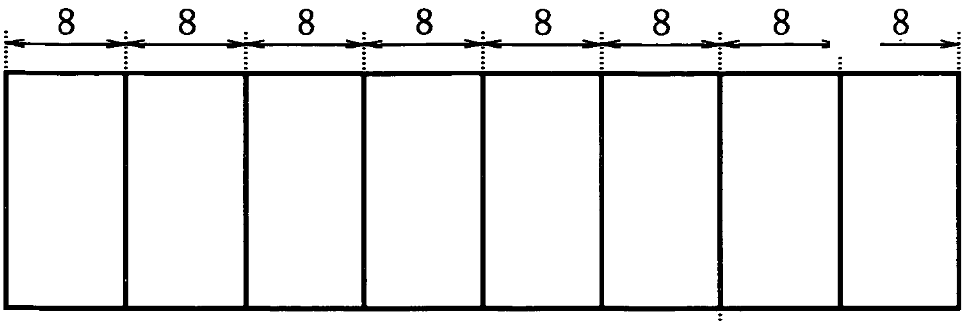
FIGS. 17(A) to 17(C) are drawings illustrating the operation of the image generator 1 in the second embodiment.
Figure 17:
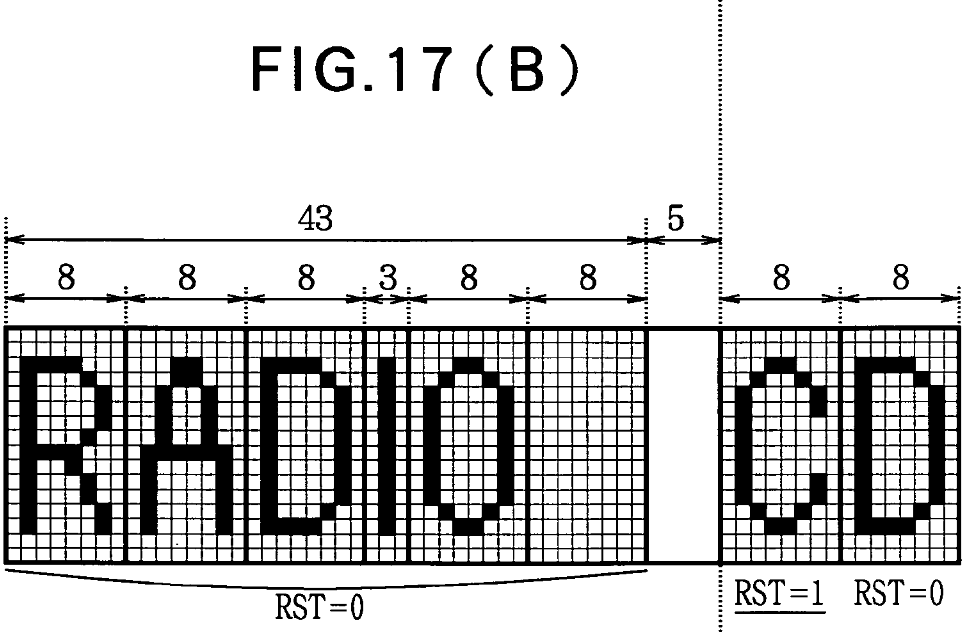
Figure 17:
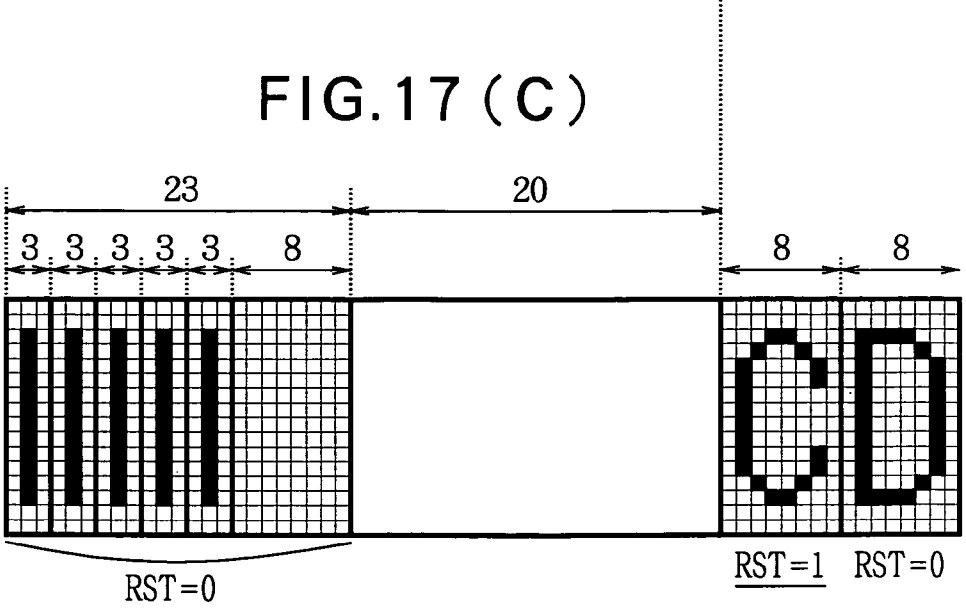

FIGS. 17(A) to 17(C) are drawings illustrating a different character string.

FIG. 17(A) shows character display positions with a fixed eight-pixel width; FIGS. 17(B) and 17(C) show the characters CD displayed after six proportional characters. In both FIG. 17(B) and FIG. 17(C), the positional reset code is asserted (RST=1) in the position of the character ‘C’, and is not asserted (RST=0) in the positions other than ‘C’. In FIG. 17(B), the six characters preceding ‘C’ are ‘RADIO’, and the six characters ‘RADIO’ are displayed over a total period of 43 pixels. In FIG. 17(C), the six characters preceding ‘C’ are ‘IIII’, and the six characters ‘IIIII’ are displayed over a total period of 23 pixels. Despite the differing display periods of the characters preceding ‘C’ in FIGS. 17(B) and 17(C), the character 'C' can be displayed in the same position with reference to the fixed-width character positions shown in FIG. 17(A).

Accordingly, character positions can remain fixed on the screen even if the proportional characters displayed before them change.

In the description given above, the positional reset code associated with a character immediately following a space is set to '1'. The positional reset code associated with a character immediately following a colon ':' or semicolon ';' may also be set to '1'.

By specifying a character code, character width data, and a positional reset code for each character position, controlling the pixel width of the displayed character according to the character width data, and generating the character position as prescribed by the positional reset code, the image generating apparatus of the second embodiment can change the pixel width at each character position and can also display characters in prescribed positions on the screen irrespective of the preceding characters. Proportional characters having individually differing pixel widths can be generated by combining the specified character codes and the character width data appropriately.

What is claimed is:

1. An image generating apparatus comprising:

a character control code storage unit that stores a character control code for each character display position, the character control code including a character code, character width data associated with the character code, and a character positional reset code that is associated with the character code, and indicates whether resetting of the character position is required or not;

a positional control unit that reads the character control code for the current character display position from the character control code storage unit, and selects whether to determine the display start position of a current character from the display end position of an immediately preceding character or to use a predetermined standard position based on a fixed width display, according to the character positional reset code in the character control code read from the character control code storage unit, and controls an occurrence period of the current character display position based on the character width data in the character control code that was read;

a character pattern storage unit that outputs a character pattern corresponding to the character code in the character control code that was read;

an image outputting unit that outputs image data representing a character shape based on the character pattern; and a standard position data generating unit that generates data indicating standard positions corresponding to numbers of character occurrences, wherein;

among the reset codes, the reset codes associated with characters following a particular character request resets; and when the reset code requires a reset, the positional control unit selects the standard position specified by the data indicating standard positions as the display start position of the current character.

2. The image generating apparatus of claim 1, wherein the particular character comprises space, colon, and semicolon characters.

3. An image display apparatus comprising:

the image generating apparatus of claim 1; and a display unit that displays image data output from the image generating apparatus.

4. An image display apparatus comprising:

the image generating apparatus of claim 1;

an image combining unit that combines input image data and image data output from the image generating apparatus; and a display unit that displays the combined image data.

5. An image generating method comprising:

a character control code storage step for storing a character control code for each character display position, the character control code including a character code, character width data associated with the character code, and a character positional reset code that is associated with the character code, and indicates whether resetting of the character position is required or not;

a step of reading the character control code for the current character display position that was stored, a positional control step for selecting whether to determine the display start position of a current character from the display end position of an immediately preceding character or to use a predetermined standard position based on a fixed width display according to the character positional reset code in the character control code that was read and controlling an occurrence period of the current character display position based on the character width data in the character control code that was read;

a character pattern storage step for outputting a character pattern corresponding to the character code in the read character control code that was read;

an image outputting step for outputting an image data representing a character shape based on the character pattern; and a standard position data generating step for generating data indicating standard positions corresponding to numbers of character occurrences, wherein;

among the reset codes, the reset codes associated with characters following a particular character request resets; and when the reset code requires a reset, the positional control step selects the standard position specified by the data indicating the standard position as the display start position of the current character.

6. The image generating method of claim 5, wherein the particular character comprises space, colon, and semicolon characters.

7. An image display method comprising a display step for displaying image data output by the image generating method of claim 5.

8. An image display method comprising:

an image combining step for combining image data output by the image generating method of claim 5 and input image data; and a display step for displaying the combined image data.

* * * * *